United States Patent
Shigyo

(10) Patent No.: US 6,742,472 B1
(45) Date of Patent: Jun. 1, 2004

(54) PRESSURE MEASURING FILM FOR MEASURING PRESSURE IN SMALL CONTACT AREA

(75) Inventor: Masao Shigyo, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/568,968

(22) Filed: May 11, 2000

(30) Foreign Application Priority Data

May 11, 1999 (JP) .......................................... 11-129496

(51) Int. Cl.⁷ .......................... G01D 11/00; G01D 13/00
(52) U.S. Cl. ...................... 116/200; 116/201; 116/202; 116/203; 116/206; 116/208
(58) Field of Search ...................... 73/715, 705; 56/45, 56/153, 346; 430/58.4, 58, 257; 349/119; 33/542; 156/234; 116/203, 208, 205, 211

(56) References Cited

U.S. PATENT DOCUMENTS

| | | | |
|---|---|---|---|
| 5,016,203 A | * 5/1991 | Komatsu et al. | 364/571.02 |
| 5,323,729 A | * 6/1994 | Rubey | 116/200 |
| 5,699,861 A | * 12/1997 | Sigafoos | 168/17 |
| 5,714,303 A | * 2/1998 | Yokoya et al. | 430/257 |
| 5,830,548 A | * 11/1998 | Andersen et al. | 428/36.4 |
| 6,064,411 A | * 5/2000 | van Sas et al. | 347/115 |
| 6,180,228 B1 | * 1/2001 | Mueller et al. | 428/354 |
| 6,221,454 B1 | * 4/2001 | Saito et al. | 428/64.1 |
| 6,254,711 B1 | * 7/2001 | Bull et al. | 156/234 |
| 6,332,226 B1 | * 12/2001 | Rush, III | 2/412 |

FOREIGN PATENT DOCUMENTS

JP    6-331467    12/1994    .............. G01L/5/00

* cited by examiner

Primary Examiner—Edward Lefkowitz
Assistant Examiner—Marissa Feguson
(74) Attorney, Agent, or Firm—Sughrue Mion, PLLC

(57) ABSTRACT

A pressure measurement method using a pressure measuring film in which a toner layer with a definite thickness is held between an adhesive layer formed on a first support and an inactive adhesive layer formed on a second support. Prior to applying the pressure to be measured to the measuring film, the inactive adhesive layer is activated to have an adhesive property. After pressure to be measured is applied to the film, the first support is removed and the applied pressure is determined based on the amount of toner attached to the second support. Using a toner having extremely small size, an extremely low pressure applied to an extremely small contact area can be measured. Also the pressure measuring film is not affected by use conditions (temperature, humidity). The inactive adhesive layer may be formed of a thermoplastic resin adhesive which can be activated by heating to become adhesive.

18 Claims, 3 Drawing Sheets

PRESSURE MEASURING FILM FOR MEASURING PRESSURE IN SMALL CONTACT AREA

FIELD OF THE INVENTION

The present invention relates to a method for measuring a pressure and recording a pressure distribution in a contact surface or a pressing site, and a pressure measuring film.

BACKGROUND OF THE INVENTION

There has heretofore been a pressure measuring film for measuring a pressure (contact pressure) applied between contact surfaces. For example, "Prescale" (tradename) is presented by Fuji Photo Film Co., Ltd. This is obtained by forming a microcapsulated color former layer on the top surface of a support (film), and superposing a color developer layer thereon. By application of pressure, the microcapsules are destroyed to release the color former from the ruptured microcapsules. The released color former is adsorbed to the developer and a color is developed by chemical reaction.

In general, the pressure measuring film has a predetermined measurable pressure range. The diameter of the microcapsule is in a range of several microns to several tens of microns, and the microcapsule is easily destroyed as the diameter increases. Accordingly, the measurable pressure range can be set by changing the size of the microcapsule for use. In the conventional film, the measurable minimum pressure is 0.2 MPa (1 MPa is nearly equal to 10.2 $kgf/cm^2$), and a pressure lower than the predetermined minimum pressure could not be measured.

As described above, in the conventional pressure measuring film, there is a problem that the measurable pressure ranges to 0.2 MPa at minimum and a lower pressure cannot be measured.

For example, in the case a contact pressure between a sheet conveying roller and a sheet is measured in a copying machine or a facsimile machine, if the contact pressure can be measured by bringing the pressure measuring film into contact with the conveying roller and conveying the film, the measurement can easily and conveniently be performed. However, such measuring operation cannot be realized because the contact pressure of the conveying roller is usually 0.2 MPa or less (usually in a range of 100 $gf/cm^2$ to 2 $kgf/cm^2$). Moreover, an extremely low pressure is sometimes set including the laminating pressure applied between front and rear glass substrates of a liquid crystal panel, the polishing pressure applied to a silicon wafer for use in a semiconductor manufacture process, and the like. The conventional pressure measuring film cannot be used for measuring such a extremely low pressure.

The conventional pressure measuring film has another problem that the contact pressure cannot be measured in an area having a size smaller than the size of the microcapsule. The measurable minimum pressure level can be decreased by increasing the size of the microcapsule. However, when the size of the microcapsules is enlarged, the minimum area where the applied pressure is to be detected is also enlarged. This results in less resolution of the pressure distribution. For example, in the field of manufacture of the semiconductor, there is need to measure the contact pressure of a bonding wire to an electrode. However, the microcapsule has a diameter of several tens of microns (1 micron= $10^{-6}$ m), while the bonding wire has a diameter of about one micron. Therefore, the conventional pressure measuring film cannot be used.

In order to lower the measurable pressure range and attain the high sensitivity, a rubber mat on which a large number of pyramid-shaped protrusions are formed is used so that the top of the pyramid abuts on the side of the pressure measuring film. The pressure applied to a pyramid bottom side converges to the tip top, and a force per unit area, that is, the pressure transmitted to the tip top can be increased. Accordingly, the pressure applied to the pressure measuring film through the tip top reaches to and is placed in the measurement range of the pressure measuring film. In this case, however, the minimum contact area to be measured is enlarged, and the pressure measuring film cannot measure the contact pressure of the bonding wire or the like. Moreover, since the conventional pressure measuring film is much influenced by a temperature and a humidity during use, the use condition needs to be strictly managed, which is inconvenient.

SUMMARY OF THE INVENTION

The present invention has been accomplished in consideration of the aforementioned circumstances, and a first object thereof is to provide a pressure measurement method in which an extremely low pressure applied to an extremely small contact area can be measured, and the influence of use conditions (temperature, humidity) is not easily exerted. A second object of the present invention is to provide a pressure measuring film for direct use in carrying out this method.

To attain the first object, according to the present invention, there is provided a method for measuring pressure comprising the steps of:

providing a pressure measuring film in which a toner layer with a definite thickness is held between an adhesive layer formed on a first support and an inactive adhesive layer formed on a second support;

subjecting said inactive adhesive layer to activation treatment, so that said in active adhesive layer become having an adhesive property;

applying the pressure to said pressure measuring film by contacting said pressure measuring film with a portion of an object where the pressure is to be measured;

stripping said first support from the pressure measuring film; and examining the amount of a toner remaining on said second support to determine the applied pressure.

The inactive adhesive layer can be formed by an adhesive which is activated by a heating treatment or an adhesive which is activated by ultraviolet rays. For example, a thermoplastic resin-based adhesive will repeatedly soften when heated and harden when cooled at normal temperatures. Such thermoplastic adhesive is applied to the second support to harden, then laminated onto the toner layer. The thermoplastic adhesive layer is heated immediately before or during pressure measurement. In other words, the thermoplastic adhesive is reactivated by heating to recover its adhesive property. Moreover, the inactive adhesive layer may be formed lf a photo-plastic resin-based adhesive which can be activated by ultraviolet rays to soften so that the adhesive characteristics is revealed. In this case, it is preferably to use a transparent or translucent film as the second support to which the inactive adhesive is coated. The photoplastic adhesive is activated by a radiation ray such as UV ray through the transparent support.

Additionally, "activation" herein refers to a treatment for generating or recovering an adhesive force in the inactive adhesive, which has no adhesive properties in an atmosphere of ordinary air, by a special treatment (heating, ultraviolet irradiation or the like). A carbon toner is suitable as the toner for use in the toner layer. The carbon toner for use in a copying machine, a facsimile machine or the like is preferable because particle size of carton toner is extremely small. The toner is uniformly dispersed in a solvent and the resultant mixture is applied or coated on the adhesive layer. In the course of drying the layer of the dispersion mixture, toner particles are bonded to one another with a weak force to form a layered structure of toners on the adhesive layer.

The magnitude of the measurement pressure can be determined based on the density of the image recorded by the toner remaining on the second support. More specifically, in a place where high contact pressure is applied, there is remained much toner which is attached and fixed to the second support by the activated adhesive, so that the density of the toner image increases. Conversely, in a place where the contact pressure is low, the toner density on the second support decreases. The toner density may visually be judged, or measured by reading the toner image of the second support with a scanner. When the toner image is read by an image sensor such as CCD, the density can be determined from the output voltage of each pixel of the image sensor.

The toner layer may be formed, for example, only of a black toner. Alternatively, a plurality of different color toner layers may be formed as multiple layers. When the low pressure is applied, only the toner in the bottom toner layer adjoining to the activated adhesive is adhered to the activated adhesive and transferred to the second support, but other toners in the upper toner layers are not transferred to the second support. Namely, the color formed of different toners attached to the second support changes by the magnitude of the pressure, the magnitude of the applied pressure can be determined by reading the densities or hues of the color image by a color scanner or the like. Moreover, the color change can be detected by naked eyes easily. This is convenient for visually estimating the magnitude of the applied pressure.

To attain the second object, according to the present invention, there is provided a pressure measuring film comprising: first and second supports; an adhesive layer formed on said first support; an inactive adhesive layer formed on said second support; and a toner layer with a definite thickness held between said adhesive layer and said inactive adhesive layer.

The first and second supports is preferably polyethylene terephthalate (PET) resin films, respectively. The toner layer may be of a single color, or may be formed by laminating different color toners into a plurality of layers. Preferably, a toner fixing agent for fixing the toner is added to the toner layer so as to prevent the toner remaining on the second support flaking or flying in air. The addition of the toner fixing agent ensures an easy handling at the time when the image density of the second support is measured. Examples of such toner fixing agents includes a liquid adhesive of which a solvent evaporates in air, and a liquid adhesive which reacts with oxygen in air to generate an adhesive force.

BRIEF DESCRIPTION OF THE DRAWINGS

FIG. 3A shows an activation treatment step of an inactive adhesive layer 16; FIG. 3B shows a step of pressing a pressure measuring film 20 with a pressing member; FIG. 3C shows a toner remaining on a second support after pressure is applied and a first support is removed off; and FIG. 3D shows the density distribution of an image recorded on the second support 12 by the toner;

DETAILED DESCRIPTION OF THE PREFERRED EMBODIMENTS

Figure 1:
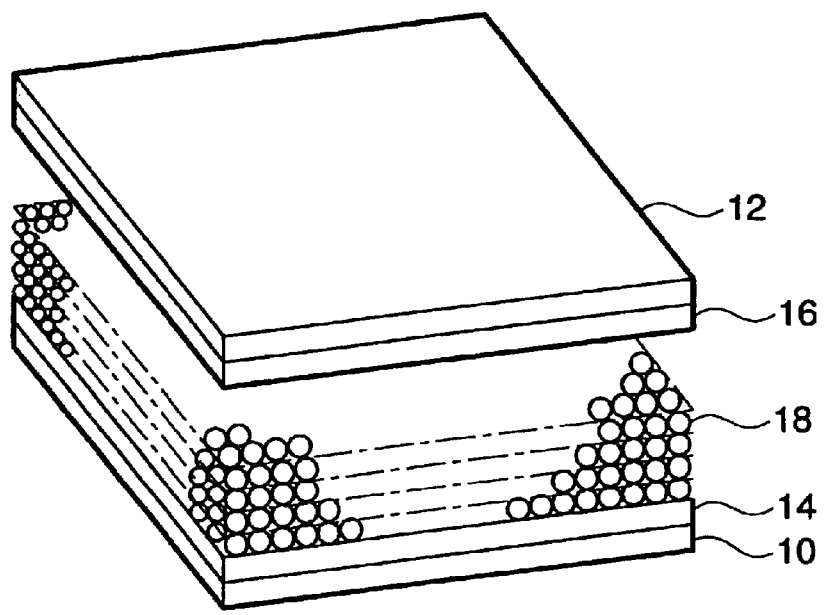
FIG. 1 is an exploded perspective view showing one embodiment of a pressure measuring film according to the present invention.
Figure 2:
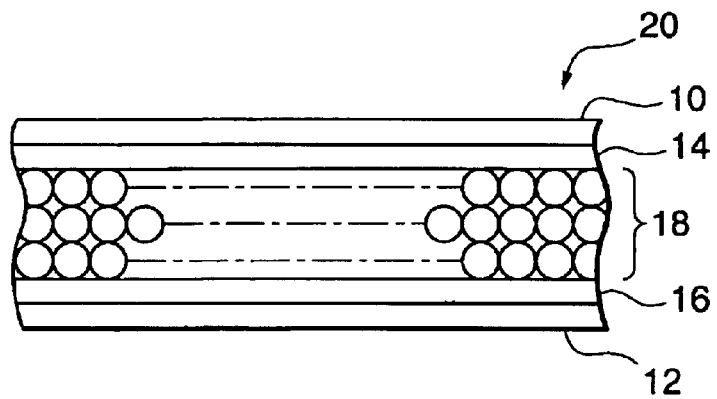
FIG. 2 is a partial enlarged sectional view of the pressure measuring film of FIG. 1.

An embodiment of the pressure measuring method of the present invention and the pressure measuring film used therein is described hereinafter with references to FIGS. 1 to 3. FIGS. 1 to 3 show an enlarged toner in an exaggerated manner, but particles are actually extremely fine.

In the figures, numeral 10 denotes a first support, and 12 denotes a second support. These supports 10, 12 are polyethylene terephthalate (PET) resin films, and a thickness of about 40 microns is preferable. An adhesive layer 14 is formed on the top surface of the first support 10, and an inactive adhesive layer 16 is formed on the bottom surface of the second support 12. The adhesive layer 14 is formed by applying an adhesive which softens to serve a sufficient adhesive force and fails to harden under normal use conditions. The adhesive for use in the adhesive layer 14 holds a toner layer 18 described later. Examples of the adhesive in the adhesive layer 14 includes a thermosetting resin-based adhesive which has a sufficiently higher setting temperature than that of the inactive adhesive of the inactive adhesive layer 16.

The inactive adhesive layer 16 is activated by a predetermined treatment so as to generate or recover an adhesive force. The inactive adhesive has no adhesive property until the activation treatment is conducted. For example, the inactive adhesive layer 16 can be formed by applying and setting a thermoplastic resin adhesive onto the second support 12. In this case, the inactive adhesive layer 16 is activated by heating. The inactive adhesive layer 16 may be formed by applying a photo-plastic resin adhesive. In this case, the second support 12 is set to be translucent, and activation can be performed by radiating ultraviolet rays via the translucent support 12.

Numeral 18 denotes a toner layer which is formed by applying a toner of extremely fine particles in a layer form. Preferable toner is a carbon toner for use in a copying machine and a facsimile machine. The toner is applied onto the adhesive layer 14 with a predetermined thickness by an appropriate method. For example, the toner is uniformly dispersed in a solvent which has an extremely weak adhesive force, and this dispersion liquid is applied or coated to the adhesive layer 14 a predetermined number of times.

After laminating the adhesive layer 14 and toner layer 18 on the first support 10, this laminate is turned upside down, and superposed onto the inactive adhesive layer 16 of the second support 12. The toner layer 18 becomes to be positioned on the inactive adhesive layer 16 to form a recording means. As a result, a pressure measuring film 20 having a sectional structure shown in FIG. 2 can be formed. The pressure measuring film 20 is used in the manner as shown in FIG. 3.

Figure 3A:
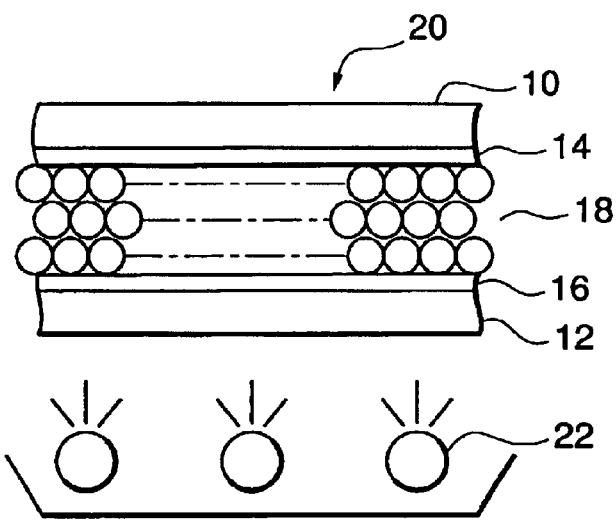
FIGS. 3A to 3D are process diagrams showing a pressure measurement method according to one embodiment of the present invention.

First, the inactive adhesive layer 16 of the pressure measuring film 20 is subjected to the activation treatment (FIG. 3A). When the thermoplastic adhesive is used, the layer 16 is activated by heating with a heater 22. When the photoplastic resin adhesive is used, an ultraviolet lamp is used instead of the heater 22 to perform the activation. In this case, the second support 12 is set to be transparent or translucent.

Figure 3B:
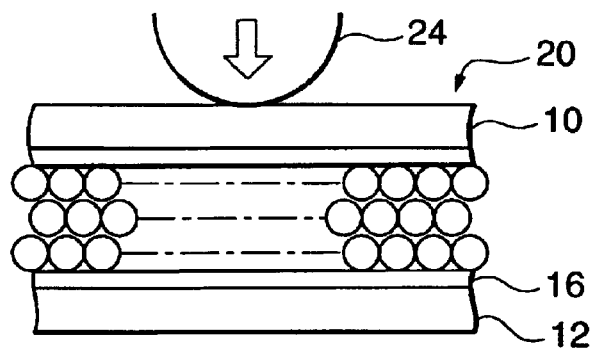

After the inactive adhesive layer 16 is activated by performing heating or UV irradiation under definite conditions, the pressure measuring film 20 is disposed in a measurement site, and pressed by a pressing member 24 (FIG. 3B). Then, a part of the toner of the toner layer 18 is attached to the activated adhesive layer 16. The amount of the toner attached to the adhesive layer 16 changes in accordance with the magnitude of the pressure applied by the pressing member 24. As the contact pressure of the pressing member 24 increases, the amount of the toner attached to the adhesive layer 16 increases.

Figure 3C:
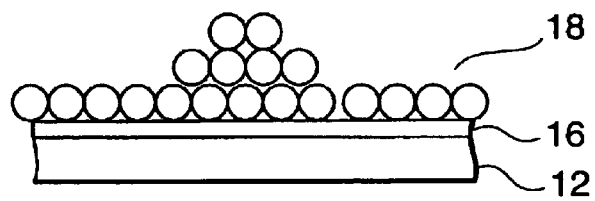
Figure 3D:
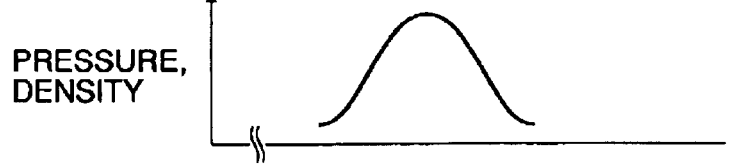

Subsequently, by stripping the first support 10 from the second support 12, the toner of the toner layer 18 is divided into two parts on the adhesive layers 14 and 16 (FIG. 3C). The amount of the toner remaining on the second support 12 increases as the pressure of the pressing member 24 increases. The toner of a low-pressure part is not attached to the activated adhesive layer 16, and is attached to the adhesive layer 14. Therefore, the magnitude of the pressure of the pressing member 24 can be determined by measuring the density of the image recorded by the toner remaining on the second support 12 (FIG. 3D). For example, by reading the image on the second support 12 by a scanner, the image density may be converted to the pressure in accordance with a predetermined conversion characteristics.

Additionally, when the first support 10 is stripped from the second support 12, the toner remaining on the second support 12 undesirably flies, moves, or easily drops upon finger touch. To avoid this, the toner layer 18 is preferably supplemented with a fixing agent which fixes the toner to the second support 12 when the toner is exposed to air by removing the first support. Usable examples of the fixing agents include an adhesive comprising a volatile solvent and an adhesive made of air cure type resin which fixes the toner when exposed to air.

The inactive adhesive layer 16 generates an adhesive force when activated. Therefore, after the activation treatment, the activated adhesive layer 16 tends to adhere to and capture the toner anytime, even before applying the pressure. Even if a little amount of the toner is attached to the adhesive layer 16 before the pressing, it is not possible to carry out accurate measurement of the applied pressure. To avoid an undesired adhesion of the toner, preferably, a thin release agent layer for controlling the adhesion of the toner is formed on the surface of the inactive adhesive layer 16. This release agent layer prevents the toner from adhering to the adhesive layer 16 in which the toner has just been activated before the application of the pressure. Furthermore, the layer structure of the release agent is designed to be destroyed by the pressure applied even if the pressure is extremely weak, and the toner is allowed to adhere to the activated adhesive layer 16.

Figure 4:
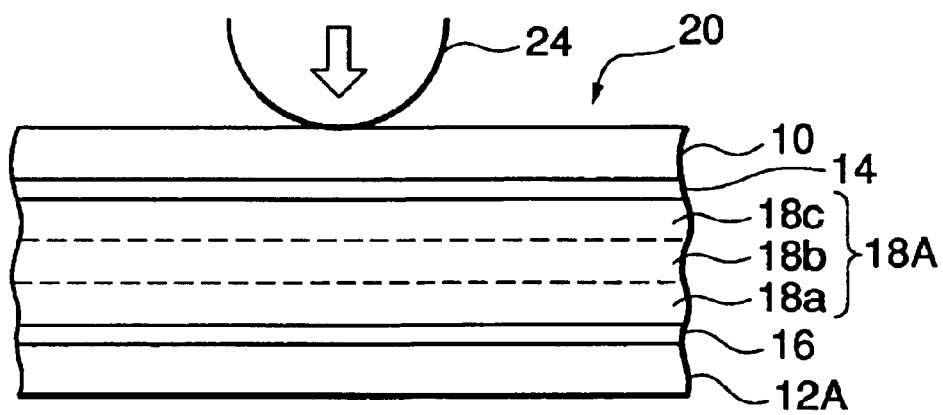
FIG. 4 is a partial enlarged sectional view showing the pressure measuring film according to a second embodiment of the present invention.
Figure 5:
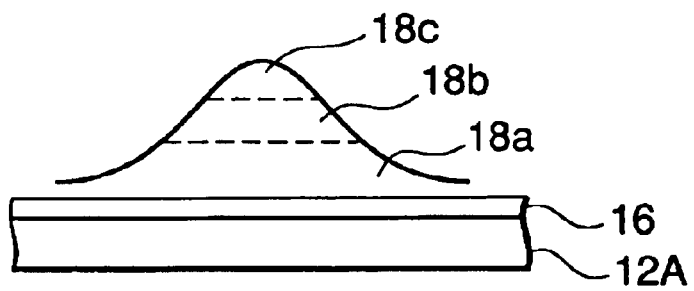
FIG. 5 is an explanatory view showing a measurement result by the pressure measuring film of FIG. 4.

FIG. 4 is a sectional view showing the pressure measuring film according to a second embodiment of the present invention, and FIG. 5 shows the shape of the toner remaining on a second support 12A after the pressure to be measured is applied. For a pressure measuring film 20A of the present embodiment, color display is realized by setting a toner layer 18A to be multilayered.

Specifically, the toner layer 18A is formed by laminating three different color toner layers 18a, 18b, 18c in each predetermined thickness. The respective toner layers 18a, 18b, 18c are formed by mixing different color toners into respective liquid adhesives having a weak adhesion and successively applying the toner layers onto the adhesive layer 14 of the first support 10. This laminate is turned upside down, and superposed onto the second support 12A to which the inactive adhesive layer 16 has been applied. Since the same parts as those of FIGS. 1 to 3 are denoted with the same reference numerals in FIGS. 4 and 5, the description thereof is not repeated.

The pressure measuring film 20A is used in the same manner as shown in FIG. 3. Specifically, after the inactive adhesive layer 16 is activated, the pressure is applied by the pressing member 24, and then the first support 10 is stripped or removed. FIG. 5 shows that the first support 10 is stripped in this manner. In this manner the amount of the toner remaining on the second support 12A, that is, the ratio of the toner amounts of the respective layers 18a, 18b, 18c changes by the pressure of the pressing member 24. Therefore, the measurement pressure can be determined from the densities or hues of color formed by the toner(s) remaining on the second support 12A.

For example, if the pressure is high, the activated adhesive layer 16 is impregnated up to the uppermost layer 18c to attach/fix the toner of the layer 18C. As a result, since the toner amount of the uppermost layer 18c remaining on the second support 12A increases, the color of the toner layer 18c is deepened. If the pressure is low, the toner amount of the lowermost layer 18a relatively increases and the color of the toner layer 18a is deepened. Since the change of the hue of the color can visually easily be judged, the magnitude of the measurement pressure can visually be estimated. Moreover, when the colored image is read by a color scanner, the measurement pressure can further accurately be obtained.

As described above, in the present invention, the toner layer is held between the (unhardened) adhesive layer formed on the first support and the inactive adhesive layer formed on the second support. The inactive adhesive layer is activated, the pressure is then applied, subsequently the first support is stripped and the magnitude of the applied pressure is determined based on the amount of the toner attached to the second support. Accordingly, by appropriately setting the balance of the adhesive force of the adhesive layer with the activated inactive adhesive layer, the thickness and hardness of the support, or the magnitude of the bond force between toners in the toner layer, an extremely low pressure can be measured.

Moreover, since the toner in the toner layer is extremely small as compared with the microcapsule which has been used in the conventional pressure measuring film, the measurement can be performed even in the case in which the contact area of the pressing member is extremely small. The toner layer, adhesive layer and inactive adhesive layer are held and stored between two supports, and the inactive adhesive layer is activated on the definite conditions immediately before the use. Therefore, an accurate pressure measurement can be performed simply by sufficiently managing the activation treatment conditions. The management of the use conditions is facilitated as compared with the conventional pressure measuring film.

Additionally, according to the present invention, the pressure measuring film for direct use in carrying out the method can be obtained.

What is claimed is:

1. A method for measuring pressure comprising the steps of:

providing a pressure measuring film in which a toner layer with a definite thickness is held between an adhesive layer formed on a first support and an inactive adhesive layer formed on a second support;

subjecting said inactive adhesive layer to activation treatment, so that said inactive adhesive layer becomes adhesive;

applying pressure to said pressure measuring film by contacting said pressure measuring film with an object;

stripping said first support from the pressure measuring film; and examining an amount of said toner remaining on said second support to determine an amount of the applied pressure.

2. The method according to claim 1, wherein said activation step comprises heating.

3. The method according to claim 1, wherein said activation step comprises applying ultraviolet rays.

4. The method according to claim 1, wherein said step of examining further comprises measuring the density of an image recorded by said toner remaining on said second support to determine the applied pressure.

5. The method according to claim 1, wherein said step of providing said pressure measuring film further comprises forming said toner layer by laminating different color toners by each definite thickness;

wherein said step of examining further comprises determining the applied pressure based on a color formed by said different color toners remaining on said second support.

6. A pressure measuring film comprising:

first and second supports;

an adhesive layer formed on said first support; and a recording means for measuring and recording a magnitude and a location of pressure applied to said pressure measuring film;

wherein said recording means comprises a toner layer formed by laminating different color toners each having a uniform thickness.

7. A pressure measuring film comprising:

first and second supports;

an adhesive layer formed on said first support; and a recording means for measuring and recording a magnitude and a location of pressure applied to said pressure measuring film;

wherein said recording means comprises:

an inactive adhesive layer formed on said second support;

a toner layer with a definite thickness held between said adhesive layer and said inactive adhesive layer; and a release agent layer formed between the toner layer and said inactive adhesive layer.

8. The pressure measuring film according to claim 6, wherein the inactive adhesive layer is formed of a thermoplastic resin-based adhesive which can be activated by heating to have an adhesive property.

9. The pressure measuring film according to claim 6, wherein said recording means comprises an inactive adhesive layer formed of a thermoplastic resin-based adhesive, wherein said inactive adhesive layer has adhesive properties when heated.

10. The pressure measuring film according to claim 6, wherein the second support is formed of a transparent film, and the inactive adhesive layer is formed of a photo-plastic resin-based adhesive.

11. The pressure measuring film according to claim 6, wherein said recording means comprises a toner layer containing a toner fixing agent which hardens when exposed to air.

12. The pressure measuring film according to claim 6, wherein said recording means comprises:

an inactive adhesive layer formed on said second support; and a release agent layer formed between the toner layer and said inactive adhesive layer;

wherein said toner layer with a definite thickness is held between said adhesive layer and said inactive adhesive layer.

13. The pressure measuring film according to claim 6, wherein said recording means comprises:

an inactive adhesive layer formed on said second support;

wherein said toner layer with a definite thickness is held between said adhesive layer and said inactive adhesive layer.

14. The pressure measuring film according to claim 7, wherein the inactive adhesive layer is formed of a thermoplastic resin-based adhesive which can be activated by heating to have an adhesive property.

15. The pressure measuring film according to claim 7, wherein said inactive adhesive layer is formed of a thermoplastic resin-based adhesive which has adhesive properties when heated.

16. The pressure measuring film according to claim 7, wherein the second support is formed of a transparent film, and the inactive adhesive layer is formed of a photo-plastic resin-based adhesive.

17. The pressure measuring film according to claim 7, wherein said toner layer contains a toner fixing agent which hardens when exposed to air.

18. The pressure measuring film according to claim 7, wherein said recording means comprises:

a toner layer formed by laminating different color toners each having a uniform thickness.

* * * * *